US008873838B2

(12) United States Patent
Suleyman et al.

(10) Patent No.: US 8,873,838 B2
(45) Date of Patent: Oct. 28, 2014

(54) METHOD AND APPARATUS FOR CHARACTERIZING AN IMAGE

(71) Applicant: Google Inc., Mountain View, CA (US)

(72) Inventors: Mustafa Suleyman, London (GB); Benjamin Kenneth Coppin, Colttenham (GB); Marek Barwinski, London (GB); Arun Nair, London (GB); Andrei-Alexandru Rusu, London (GB); Chia-Yueh Carlton Chu, Howick (NZ)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/804,257

(22) Filed: Mar. 14, 2013

(65) Prior Publication Data

US 2014/0270488 A1   Sep. 18, 2014

(51) Int. Cl.
*G06K 9/62* (2006.01)
(52) U.S. Cl.
CPC .................. *G06K 9/6217* (2013.01)
USPC ......................................................... 382/157
(58) Field of Classification Search
CPC .................................................... G06K 9/6217
See application file for complete search history.

(56) References Cited

U.S. PATENT DOCUMENTS

| | | | | |
|---|---|---|---|---|
| 5,164,992 A * | 11/1992 | Turk et al. | ...................... | 382/118 |
| 2003/0002731 A1 * | 1/2003 | Wersing et al. | ............... | 382/161 |
| 2007/0237364 A1 * | 10/2007 | Song et al. | ...................... | 382/115 |
| 2008/0082426 A1 * | 4/2008 | Gokturk et al. | .................. | 705/27 |
| 2009/0116698 A1 | 5/2009 | Zhang et al. | | |
| 2009/0232409 A1 * | 9/2009 | Marchesotti | .................. | 382/254 |
| 2011/0182474 A1 * | 7/2011 | Pope et al. | ..................... | 382/103 |
| 2011/0274314 A1 * | 11/2011 | Yang et al. | ..................... | 382/103 |
| 2013/0044944 A1 * | 2/2013 | Wang et al. | .................... | 382/165 |

FOREIGN PATENT DOCUMENTS

EP    1 262 907 A1   12/2002
WO   WO-2011/152821   * 12/2011 ............... G06T 7/00

OTHER PUBLICATIONS

Peng, Jiang, and Qin Xiao Lin. "Automatic classification video for person indexing." Image and Signal Processing, 2008. CISP'08. Congress on. vol. 2. IEEE, 2008.*
Andoni et al "Near Optimal Hashing Algorithms for Approximate Nearest Neighbor in High Dimensions" Communications of the ACM, vol. 51, No. 1 2008.
Bellman, Richard "The Theory of Dynamic Programming" Bulletin of the American mathematical Society, 1954.
Bieniek, et al "An Efficient Watershed Algorithm Based on Connected Components", Patteren Recognition vol. 33, Issue 6, Jun. 2000.
Kakumanu et al "A Survey of Skin Color Modeling and Detection Methods" Journal of Patteren Recognition 40, 1106-1122, 2007.
Meyer, et al "Morphological Segmentaion", Journal of Visual Communication and Image Representation vol. 1, Issue 1, Sep. 1990.

(Continued)

*Primary Examiner* — Bhavesh Mehta
*Assistant Examiner* — Andrew Moyer
(74) *Attorney, Agent, or Firm* — Fish & Richardson P.C.

(57) ABSTRACT

The present invention relates to a method and system for characterizing an image. The characterization may then be used to conduct a search for similar images, for example using a learning system trained using previously characterized images. A face may be identified within the image and a subsection extracted from said image which does not contain said face. At least one fixed size patch is taken from said extracted subsection; and input into said learning network to characterize said image.

22 Claims, 9 Drawing Sheets

(56) References Cited

OTHER PUBLICATIONS

Meyer, "Color Image Segmentaion", International Conference on Image Processing and its Applications, p. 303-306, 1992.
Sherrah et al "Skin Colour Analysis" Sep. 2007.
Viola, et al "Rapid Object Detection Using a Boosted Cascade of Simple Features" Conference on Computer Vision and Pattern Recognition, 2001.
Authorized officer Coen De Jong, International Search Report and Written Opinion in PCT/GB2014/050679, mailed May 23, 2014, 15 pages.
Fan et al., "A Feature-based Object Tracking Approach for Realtime Image Processing on Mobile Devices," Proceedings of 2010 IEEE 17th International Conference on Image Processing, Sep. 26-29, 2010, Hong Kong, pp. 3921-3924.
Yang and Yu, "Real-time Clothing Recognition in Surveillance Videos," 2011 18th IEEE International Conference on Image Processing, pp. 2937-2940.
Sziranyi and Csapodi, "Texture Classification and Segmentation by Cellular Neural Networks Using Genetic Learning," 1998, Computer Vision and Image Understanding, 71(3):255-270.

\* cited by examiner

METHOD AND APPARATUS FOR CHARACTERIZING AN IMAGE

FIELD OF THE INVENTION

The present invention relates to a method and system for characterizing an image. The characterization may then be used to conduct a search for similar images, for example using a learning system trained using previously characterized images.

BACKGROUND OF THE INVENTION

FIGS. 1a to 1d are each an image of a person wearing striped clothing and are typical of catalogue images of models wearing the clothes. FIGS. 1a and 1b show males wearing striped T-shirts; FIG. 1a with blue and white stripes and FIG. 1b with black and white stripes. FIG. 1c shows a female wearing a black and white striped dress and FIG. 1d shows a female wearing a blue and white striped skirt. The scale of the images in FIGS. 1a to 1c are approximately the same whereas FIG. 1d has a smaller scale because it is "zoomed out" to show the entire model.

FIGS. 1a to 1d are examples of images which may be used to train a learning system such as a convolutional neural network, auto-encoder or other neural network or the like to classify the pattern contained in images. In the case of the convolutional neural network, a very large labeled training set is required because otherwise there is not enough data available to the neural network to help it learn which aspects of the images are pertinent. In this case, the striped pattern is the key element and other aspects such as the hair-color of the models or the shoes they are wearing are irrelevant. In the case of an unsupervised network such as an auto-encoder, the network would learn to cluster the images according to a whole range of factors, of which pattern may well be one, but it would not be an efficient (or effective) way to learn to classify (or search) images based on pattern alone.

The present invention seeks to provide a more efficient method for training a learning system to identify patterns (or other characteristics) within an image and once trained, to search for related images.

SUMMARY OF THE INVENTION

According to a first aspect of the invention, there is provided a computer-implemented method for characterizing an image using a learning network; the method comprising:
   receiving in the computer an image;
   identifying, using the computer, any face within the image;
   when a face is identified within said image;
   extracting a subsection from said image which does not contain said face;
   taking at least one fixed size patch from said extracted subsection; and
   inputting said at least one fixed size patch into said learning network to characterize said image.

By removing the face, the characterization is focused on a more pertinent portion of the image. By using a fixed size patch, the characterization is more uniform across images of different sizes. Both of these features should improve the efficiency of the characterization of the image. Another advantage of using a fixed size patch which is smaller than the subsection is that more than one patch may be taken from each subsection. Thus various different patches may be used to characterize the image. This is helpful as explained in more detail when training a learning system. Further features may be included to provide further improvements.

For example, any background within the image may be removed before extracting said subsection from said image. Again, this focuses the subsection on a more pertinent portion of the image. The background may be extracted by applying a mask, e.g. using any known method, including the Watershed method. The face may also be identified using any known method, e.g. by detecting Haar-wavelets.

A size of said face may also be computed and the subsection may be rescaled based on said calculated face size. This ensures that all input patches have a similar of the same scale which addresses the problem explained above in relation to FIGS. 1a to 1d.

Thus according to another aspect of the invention, there is provided a computer-implemented method for extracting a subsection from an image; the method comprising:
   inputting to the computer an image;
   identifying, using the computer, any face within the image;
   when a face is identified within said image;
   extracting a subsection from said image which does not contain said face;
   calculating, using said computer, a size of said face and
   rescaling, using said computer, said subsection based on said calculated face size The following features may be used in combination with either of the aspects identified above.

The identified face may be analyzed to determine a skin tone for the face. This may be done using known techniques. The skin tone may also be analyzed by cropping the image to a bounding area which encompasses the face and determining a skin tone area within said bounding area. The skin tone area is determined by detecting a largest area within said bounding area which comprises only pixels which are likely to be skin. This may be done, by comparing all colour pixels in the bounding area with a predefined set of values which have been determined to be a good match for skin. Once the skin tone area (largest area) is identified, further processing may be applied to identify other areas of skin within the whole original image. They may then be removed from said image before extracting said subsection from said image. For example, a skin tone mask may be used to remove any patches from said image having a similar color to said determined skin tone. This may be done by clustering the pixels within the skin tone area and comparing a value for each cluster with a value for each pixel in the whole image.

It will be appreciated that where skin tone is removed using a mask and the background is removed using a mask, the background mask and skin tone mask may be combined. It will be appreciated that removing both the skin areas and the background means that the selected subsection is likely to focus on the main characteristic of the image, e.g. a striped pattern for an image of a model wearing a striped skirt. Removing the skin tone may inadvertently remove skin color from the subsection, e.g. flecks of skin tone within a skirt. Accordingly, a median filter (or other similar mechanism) may be applied to replace any speckles of skin tone.

The image may be grayscaled, i.e. color may be removed, before any processing is carried out. Alternatively, the grayscaling step may be applied to said extracted subsection.

The extracted subsection may be the largest section of the image with no skin or background. The largest section may be determined using dynamic programming.

Each said patch has a fixed size, for example 32×32 pixels. As indicated above, a plurality of fixed size patches may be taken from within said extracted subsection and each of said plurality of patches may be input into said learning system.

This is particularly helpful when training the learning system. Training said learning system may involved using a training set of images each having known values for said characteristic wherein said training comprises repeating said extracting; taking and inputting steps for each image within said training set. By using a plurality of patches from within the same subsection, the training set is increased in size dramatically. Several patches, for example between 100-300, preferably 200, may be taken from each extracted section. The patches may also be extracted at different scales and/or a number of linear distortions, for example, mirroring, jittering, flipping, zoom-in by a small random factor, etc may be applied to artificially increase the size of the dataset.

Said learning system may be a neural network, for example a convolutional neural network or an auto-encoder. The neural network preferably comprises an output layer which contains one node (neuron) per category of characterization. Various categories may be included such as categories for pattern such as horizontal stripes, flowers, polka-dots, plain etc. The output layer is a set of numbers which preferably sum to one and which represent the extent to which each of these categories is contained in the patch. As is well known in the art, a neural network consists of an interconnected group of artificial neurons. In most cases a neural network is an adaptive system that changes its structure during a learning phase. Neural networks are used to model complex relationships between inputs and outputs, i.e. to take an input image and output a characterization, e.g. pattern, for said input image.

Said neural network may comprise at least one non-linear layer, e.g. a said non-linear layer which applies a tanh non-linearity. Use of a non-linearity means that even a two layer network can theoretically represent any continuous function and thus the space of mappings which the network can learn is increased.

Said neural network may comprise at least a first layer comprising a plurality of units (e.g. filters) and at least one subsequent layer which is connected to said first layer and which comprises a plurality of units (e.g. tanh units) and a connectivity table having the connections between said units in said first layer and said units in said subsequent layer is defined when said network is created. The number of connections may be reduced by using a smaller number (e.g. k) of units from the first layer with the smaller number of units being selected at random and the selection being fixed on creation of the network.

Said neural network may comprise at least one downsampling layer whereby the number of outputs from the previous layer which connects to the downsampling layer is reduced. There are many techniques for reducing the dimension, for example by applying a max-pooling operation to each input.

The neural network may further comprise a multi-layer perceptron (MLP) layer or other similar learning layer. An MLP typically consists of multiple layers of nodes in a directed graph, with each layer fully connected to the next one. Except for the input nodes, each node is a neuron (or processing element) with a nonlinear activation function. MLP utilizes a supervised learning technique called back-propagation for training the network. MLP may be useful because it may be able to distinguish data that is not linearly separable.

Once trained, the learning system may be used to search for images within a database which have been characterized and which are potentially matches to a search query inputted by a user.

Thus, according to another aspect of the invention, there is provided a computer-implemented method for searching for at least one image which matches a query image, the method comprising:
  receiving, in the computer, the query image;
  identifying, using the computer, any face within the image;
  when a face is identified within said image;
  extracting a subsection from said query image which does not contain said face;
  taking at least one fixed size patch from said extracted subsection;
  inputting said at least one fixed size patch into said learning network to characterize said query image;
  comparing said characterization of said query image with a characterization of a plurality of images within a search database and
  outputting at least one image which matches said query image.

The characterization of the query is thus done using the techniques described above. Similarly, the characterization of each image within the database may have been done in a similar manner. Accordingly, the features described above in relation to characterization of an image and the nature of the learning network apply equally to this embodiment.

Additional information may be stored in the database alongside the characterization of the image, for example the type of clothing and/or personal characteristics (e.g. age/gender) of any model wearing the clothing. Accordingly, the method may further comprise determining a location of said face relative to said extracted subsection within said query image and filtering said outputted images based on said determined location. Similarly, the method may further comprise determining personal characteristics of said face within said query image and filtering said outputted images based on said determined personal characteristics.

The image may also be input to a color analysis module to extract a color histogram. The color histogram may be compared with color histograms for each of the images within the database and the output results may be filtered based on the color histogram.

In each embodiment the characterization of the image may comprise generating a pattern category histogram.

According to other aspects of the invention, there are also provided systems for implementing the computer-implemented methods above. Thus, the invention may provide a computer for characterizing an image using a learning network; the computer comprising:
  an input for receiving an image;
  a learning network;
  a processor which is connected to said input and said learning network and which is configured to
  identify any face within the image; and
  when a face is identified within said image;
  extract a subsection from said image which does not contain said face;
  take at least one fixed size patch from said extracted subsection; and
  output said at least one fixed size patch into said learning network to characterize said image.

There may also be a query server for searching for at least one image which matches a query image, the server comprising:
  an input for receiving the query image;
  a learning network;
  a processor which is connected to the input and the learning network and which is configured to:
  identify any face within the image;

when a face is identified within said image;
extract a subsection from said query image which does not contain said face;
take at least one fixed size patch from said extracted subsection;
input said at least one fixed size patch into said learning network to characterize said query image;
compare said characterization of said query image with a characterization of a plurality of images within a search database and
output at least one image which matches said query image.

The invention further provides processor control code to implement the above-described systems and methods, for example on a general purpose computer system or on a digital signal processor (DSP). The code may be provided on a non-transitory carrier such as a disk, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

The invention is diagrammatically illustrated, by way of example, in the accompanying drawings, in which:

FIGS. 2b and 2c are selections from the sample image of FIG. 2a;

DETAILED DESCRIPTION OF THE DRAWINGS

Figure 1A:
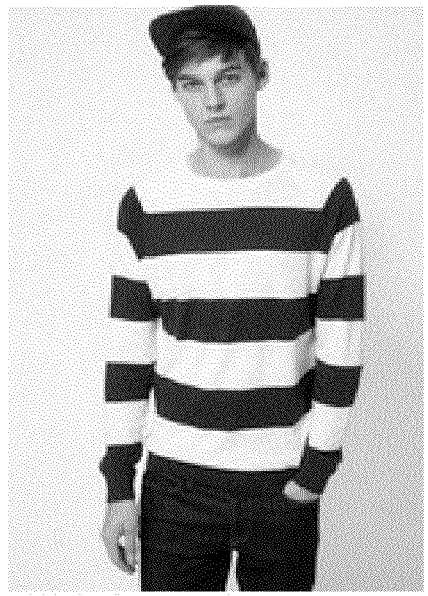
FIGS. 1a to 1d show various different sample images that may be input to a learning system.
Figure 1B:
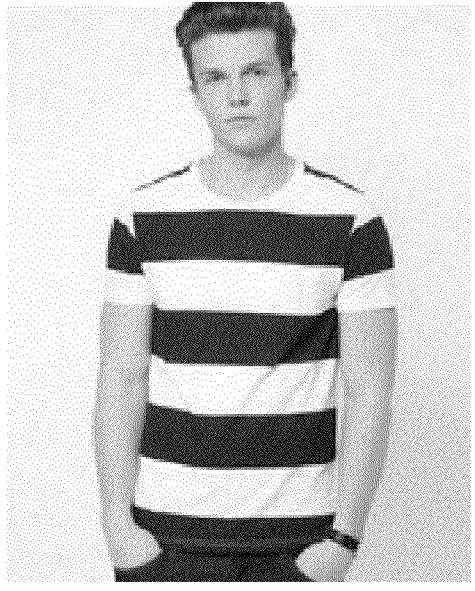
Figure 1C:

As set out above, FIGS. 1a to 1d are each images of a person wearing striped clothing. It is clear that the stripes in FIGS. 1a and 1b have approximately the same width and that the stripes in the clothing of FIG. 1c are narrower. However, it is difficult to determine the size of the stripes in the striped pattern of FIG. 1d relative to the patterns in the other Figures because of the different scale.

Figure 1D:
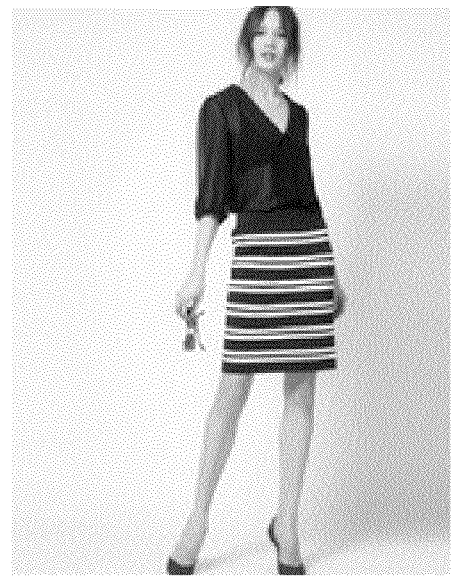
Figure 2A:
FIG. 2a is a further sample image.
Figure 2B:

FIGS. 1a to 1d are examples of images which may be input to a training network to train it to recognize a striped pattern and once trained, to recognize similar patterns in new images. As set out in the background section, using such whole images in a learning system necessitates a large training set to ensure that the learning system focuses on the key characteristic, the striped pattern. By contrast, in the present invention, a subsection of the image is extracted and then input to the learning system to improve efficiency. For example, FIG. 2a shows another image of a person wearing striped clothing and FIG. 2b shows an extracted subsection (or patch) from FIG. 2a. The subsection shown in FIG. 2b just contains the striped pattern (and color) that is dominant in the item of clothing. Thus, the subsection is the most pertinent part of the image. The whole of this subsection could be input to the training network. However, as set out below, the subsection is further divided into small patches such as the one shown in FIG. 2c and the patch is input to the training network both to train the network and also to conduct a search as explained below. The advantages of creating such patches include the creation of a larger training set which is more focussed on the pattern. Accordingly, the training network will be able to learn the characteristics of this pattern from a smaller training set than if the whole images were used.

Figure 3:
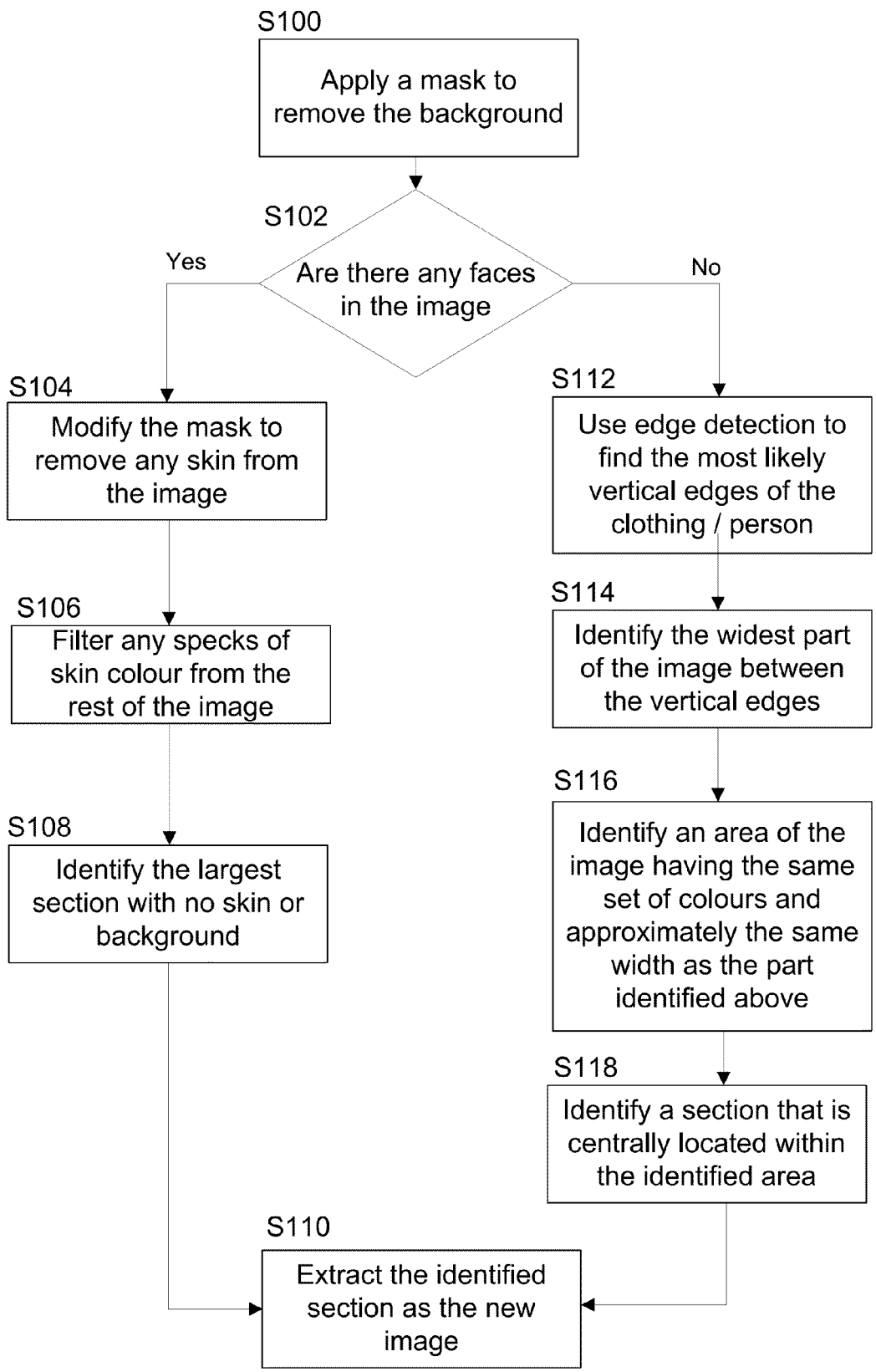
FIG. 3 is a flowchart showing the steps in the method for processing a sample image.
Figure 4A:
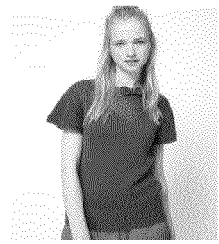
FIGS. 4a to 4f illustrate the different stages in FIG. 3 applied to an image.
Figure 4D:
Figure 4B:
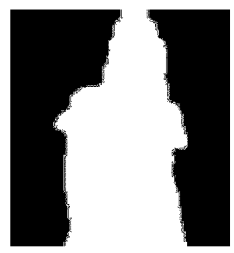

FIG. 3 sets out the steps for extracting a subsection such as that shown in FIG. 2b. The method is illustrated with reference to an input image shown in FIG. 4a which shows a female wearing a khaki top. At step S100, a mask is applied to the input image to remove the background. The result is shown in FIG. 4b. There are many known methods for removing a background. For example, one method is known as Watershed and is described in various papers such as "Morphological Segmentation" by Meyer et al published in the Journal of Visual Communication and Image Representation Vol 1, Issue 1 September 1990; "Color Image Segmentation" by Meyer published in International Conference on Image Processing and its Applications 1992 P303-306; or "An efficient watershed algorithm based on connected components" by Bieniek et al published in Pattern Recognition Vol 33, Issue 6, June 2000. These papers are incorporated by reference.

Figure 4E:
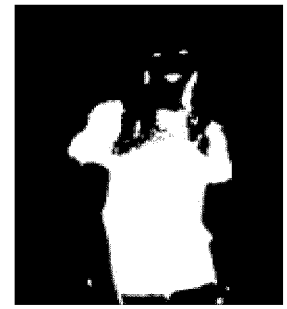
Figure 4C:
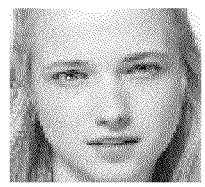

At step S102, any faces in the image are identified. There are many standard face detection algorithms, such as the Haar-like features used in OpenCV which are described in "Rapid Object Detection using a Boosted Cascade of Simple Features" by Viola et al published in Conference on Computer Vision and Pattern Recognition 2001. The result of the face identification is shown in FIG. 4c. If there are no faces, the method proceeds to step S112. If at least one face is identified, the following steps are applied for each face.

At step S104, the range of colors that make up the face are identified to determine the skin tone for the model wearing the clothing. This may be done in many ways, for example as shown in the flowchart of FIG. 10. This method is an effective way to find the skin-tones contained in an image regardless of lighting, image quality, etc. The first step S400 is to detect a face in a grayscale version of the input (e.g. using Haar wavelets as described above). The image is then cropped to a bounding polygon around the face (S402). The polygon is typically rectangular. At step S404, a subset of the color pixels in this bounding rectangle that are very likely to be skin is detected. This is preferably done by comparing the pixels against a pre-defined set of hue and saturation values which have been heuristically pre-determined to be a good match for skin tones. For example, techniques such as those used in "A survey of skin-color modeling and detection methods" by Kakumanu et al published in the Journal of Pattern Recognition in 2007 (P1106-1122) and "Skin Color Analysis" by Sherrah et al published in September 2007 (http://ist.ksc.kwansei.ac.jp/~kono/Lecture/CV/Protected/Rejume/Skin.pdf).

Once the skin tones have been identified, step S406 finds the largest polygon within the cropped polygon (i.e. within the face bounding polygon) that contains only these skin-tones. Again the polygon is typically rectangular. The largest polygon may be found in any known way, for example using the dynamic programming technique described below. Selecting such a polygon favors pixels that are in the desired range and are also spatially coherent. This means that areas of skin rather than dots of skin-like hue in the hair or background is more likely to be selected.

Further processing is then applied to the skin-tone polygon to better understand the skin tone of the person within the image and to identify other areas of skin, e.g. arms or legs. Again, there are various techniques which include using color models, such as HSL and HSV which are the two most common cylindrical co-ordinate representations of points in an RGB colour model. HSL stands for hue, saturation, and lightness, and is often also called HLS. HSV stands for hue, saturation, and value, and is also often called HSB (B for brightness). Thus in one embodiment, all the pixels within the skin tone polygon are clustered into a few clusters, for example in HSV space (S408). Any clustering algorithm may be used, for example k-means with, for example k=4; in other words, clustering the colors in the rectangle into four clusters.

Once the clusters are determined, the mean color distance (MCD) between HSV values for the pixels in each cluster is determined (S410). This determines the size of each cluster: in other words, how much variance there is in the colors of the pixels in that cluster. If the variance is zero (or very close to zero), a heuristically determined non-zero minimal value is used instead. Using the values for each cluster, at step S412 all the pixels in the original whole image are now considered in relation to each cluster centroid (in HSV space). At step S412, we thus find all the pixels in the whole image having a value (in HSV space) that is closer to the cluster than the MCD. We don't need to extend the range because the purpose is not to find all skin pixels but simply some. In this way, we can determine (S414) the positioning of the limbs which constrains where the torso/body can be and where we crop out the clothes.

Returning now to FIG. 3, at step S106, the identified skin tone is used to modify the original mask to remove any parts of the image having the same color as the skin tone as well as the background. The result is shown in FIG. 4d and illustrates that the mask has removed the background together with skin color from the edges of the clothing, e.g. the arms, face etc and also from within the clothing which leaves speckles across the clothing. Accordingly, at step S106, a median filter is applied to the resulting mask to remove any specks from the clothing. Thus, as shown in FIG. 4e, the clothing no longer has specks of black (i.e. mask) across it.

Figure 4F:
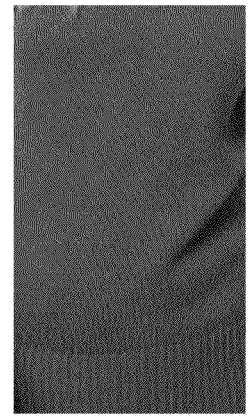

The largest section of the image with no skin or background is then identified at step S108. Typically, such a section will lie below the face and between the limbs. The largest section is shown in FIG. 4f. The image of FIG. 2b is also extracted using a similar process. There are various methods for identifying this section, for example by moving and resizing a rectangle around the image until no skin or background is included therein. Alternatively, dynamic programming which is a standard approach to solving complex problems may be used. The basic principle is to divide the problem into different parts (subproblems), then combine the solutions of the subproblems to reach an overall solution. Dynamic programming is a well known technique which is described for example in "The Theory of Dynamic Programming" by Richard Bellman published in 1954 in the Bulletin of the American Mathematical Society.

The extracted section is output at step S110. The extracted section is typically rectangular but may also be another shape. However, each extracted section needs to have the same shape.

If no face is detected in the image, an alternative algorithm as shown in steps S112 to S118 is used to create the extracted section. The first step S112 is to use a standard edge detection method to find the most likely edges of the clothing and/or person wearing the clothing. Once the edges (normally the vertical edges) are identified, the left and right boundaries of the object and the maximum and median widths between the boundaries are identified (S114). This area is broken down into areas of homogeneous colour and pattern, and the largest such region is identified (or potentially the largest two or three contiguous regions are identified and joined together) (S116). The color and pattern comparison means that the identified area is more likely to be clothing than background. As large an area as possible is used to ensure that as much of the key pattern is captured as possible. Finally, at step S118, a centrally located section is selected from within the identified area. The centrally located section has a smaller width and height than the identified area, for example perhaps 60%. Taking such a central section reduces the chance of including parts of the background and/or person wearing the clothes. This section is then output at step S110.

Figure 5:
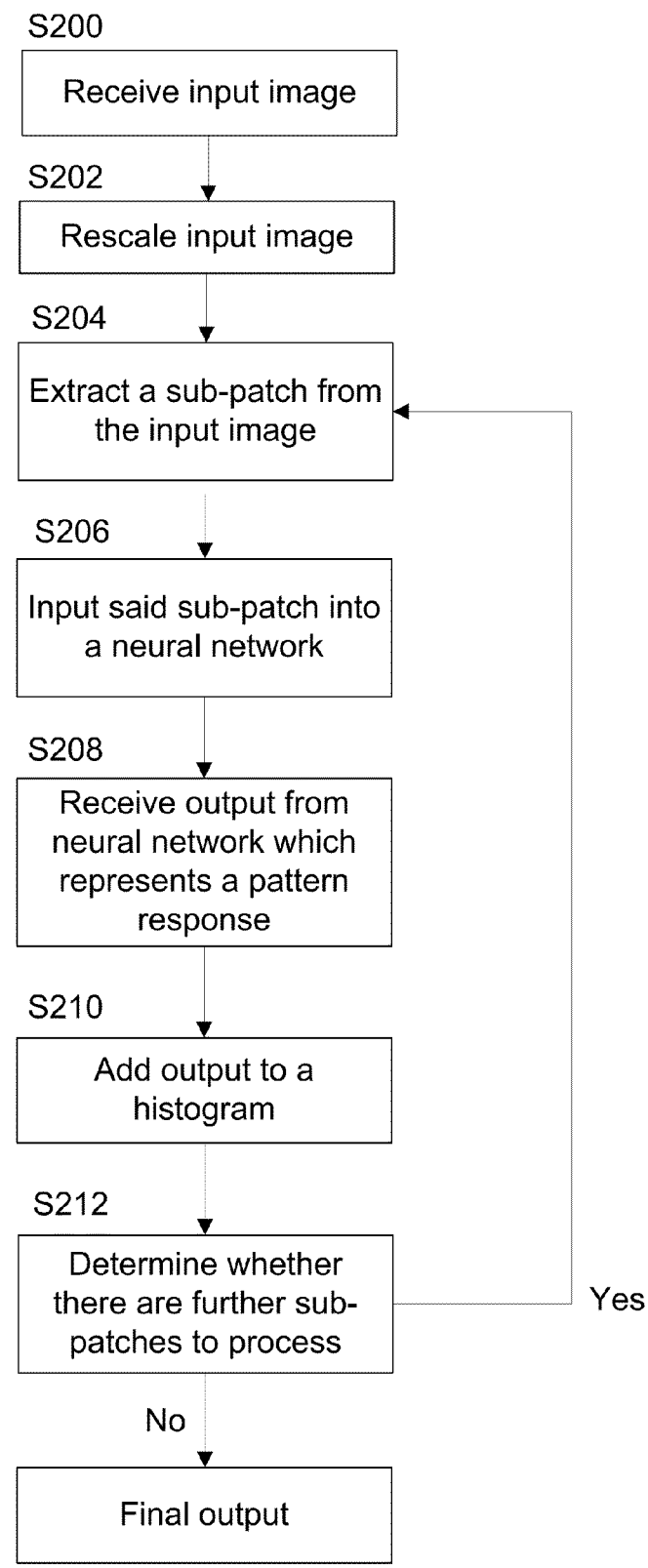
FIG. 5 is a flowchart showing the steps in inputting the image resulting from FIG. 3 into a learning system.

FIG. 5 sets out the steps for processing the extracted section output from FIG. 3. At step S200, the extracted section is received as the input image. In a preferred embodiment, the input image is rescaled at S202. This rescaling can be done using information regarding a face detected in the image. For example, the size of the face within the image can be identified and the extracted section can be scaled according to the size of the face. As shown in FIGS. 1a to 1d, the size of the faces in FIGS. 1a to 1c are roughly the same. Accordingly, sections extracted from these images would have a similar scale. In FIG. 1d, the face is considerably smaller and thus the scale of the extracted section would be increased to match those in FIGS. 1a to 1c.

Figure 2C:

After any rescaling, a patch (also termed sub-patch) is extracted at random from the extracted section (S204). The advantage of taking a patch from the extracted section is that the patch will have a uniform or fixed size, for example 32×32 pixels. An example of a patch is shown in FIG. 2c. The patch is then input into a neural network (S206) which is explained in more detail below. The output from the neural network summarizes the pattern contained in the patch (S208). This output is added to a histogram or other feature record which represents the pattern for the whole image (S210). The next step is to determine whether or not to process any further patches. Several patches, for example between 100-300, preferably 200, are taken from each extracted section. If there are more patches to process, the system conducts steps S204 to S212 again. When the requisite number of patches have been added to the overall record (histogram); the record is output.

Figure 6:
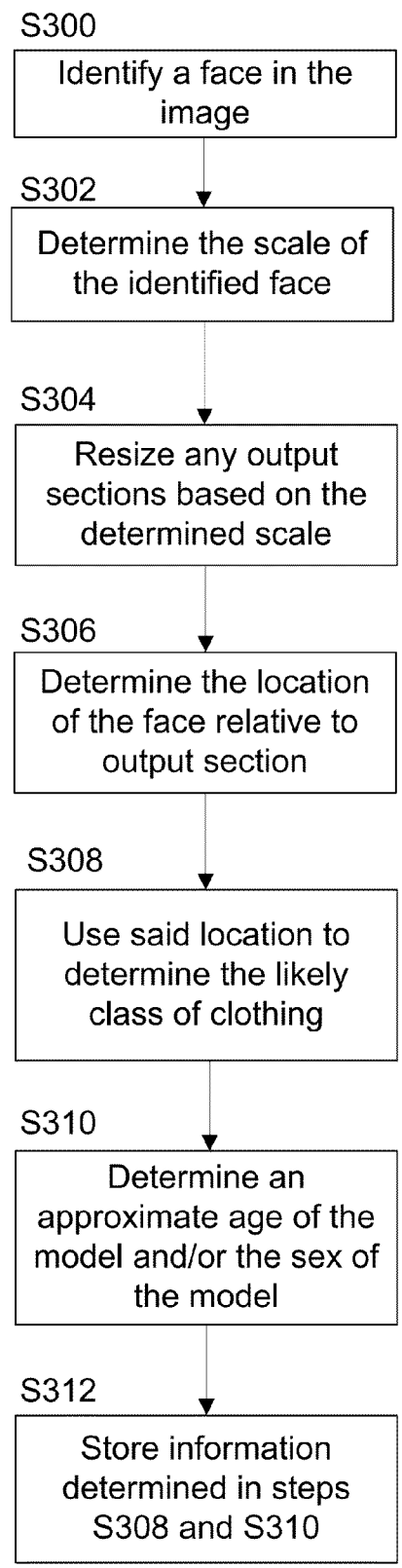
FIG. 6 is a flowchart illustrating various additional steps in the method when a face is identified in the image.

FIG. 6 shows various steps which may be optionally included if a face is identified in the image (Step S300). As explained in relation to FIG. 5, one option is to determine the scale of the identified face (S302) and resize the extracted section based on this determined scale (S304). Another option is to determine the location of the face within the image and in particular relative to the extracted section (S306). For example if the extracted section is close to the face, it is likely to form part of a top such as a shirt or T-shirt. Thus the location may be used to determine the likely class of clothing, e.g. top; lower garments such as trouser or skirt; dress; and footwear such as shoe or boot. A third option is to determine the personal characteristics (e.g. an approximate age and/or gender) of the person wearing the clothing. This information may be stored alongside the feature record of the pattern and/or with other information such as colour or the likely class of clothing identified above. Any such information may be used to improve a search for similar images, e.g. by using the information to filter results. For example, if a search is conducted for an image of dress that is being worn by a female model in their fifties, results having a matching pattern could be filtered to those with similar aged females thus excluding matching results worn by men or much younger women. This is more likely to match the interests of the person conducting the search.

Figure 7:
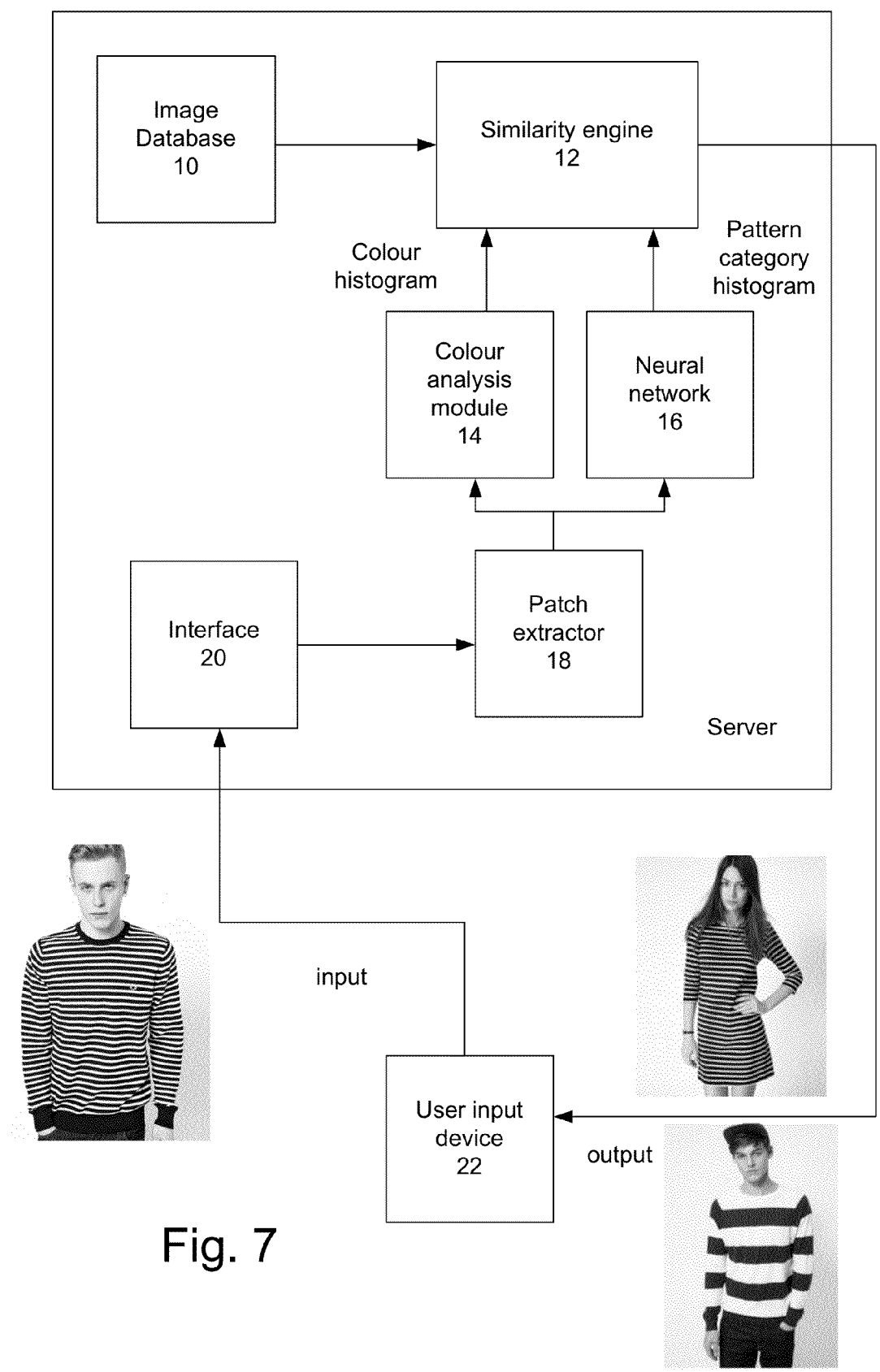
FIG. 7 is a diagram illustrating the components of the system.

FIG. 7 shows a block diagram of components which may be used in the present system. A user inputs an image, for example the image from FIG. 2a, using a user input device 22. The input device may be a camera phone which is used to take a photograph of the input image. Alternatively, the input device may be any computing device such as a desktop, laptop, a tablet etc. The image may be selected from a database on the input device or may be selected from a website. The image is then input to the server running the methods of the present invention. In FIG. 7, the server is shown a single computing device with multiple internal components which may be implemented from a single or multiple central processing units, e.g. microprocessors. It will be appreciated that the functionality of the server may be distributed across several computing devices. It will also be appreciated that the individual components may be combined into one or more components providing the combined functionality. Moreover, any of the modules, databases or devices shown in FIG. 7 may be implemented in a general purpose computer modified (e.g. programmed or configured) by software to be a special-purpose computer to perform the functions described herein.

The image is input to an interface 20 of the server such as an API (Application Programming Interface). The image is then passed to a patch extractor 18 which extracts the extracted section and the patches (subpatches) from within the extracted section as described above. The patch extractor may be implemented in hardware or a combination of hardware and software (e.g. as a module executed by a programmable processor of a machine). Each patch is then input to a neural network 16 or similar learning module for pattern classification which is output as a pattern category histogram. The patch is preferably gray scaled to remove color before being input to the neural network 16. For example, this may be done by using just the Y component in YUV color space. The YUV model defines a color space in terms of one luma (Y) and two chrominance (UV) components. Thus, Y is roughly the luminance.

The patch extractor also has an input to a color analysis module 14. The color analysis module may be implemented in hardware or a combination of software and hardware (like the patch extractor). The input to the color analysis module 14 is preferably the extracted section rather than the individual patches which are fed to the neural network. The color analysis module then extracts a color histogram for the extracted section which is representative of the clothing within the image. The color histogram may be created using standard techniques, for example by examining individual pixels.

As is well known, a histogram consists of tabular frequencies, typically shown as adjacent rectangles, erected over discrete intervals. The area of each rectangle is normally equal to the frequency of the observations in the interval. The height of a rectangle is equal to the frequency density of the interval. The total area of the histogram is equal to the number of data.

Both histograms may then be input to a similarity engine 12. The similarity engine module may be implemented in hardware or a combination of software and hardware (like the patch extractor). If both color and pattern are being used to determine matching results, the similarity engine 12 compares both histograms with all the histograms of the images within the image database 10. Alternatively, only color or pattern may be used for determining matching images. There are various known methods for ensuring that the comparison process is done efficiently and not necessarily by comparing every single image in the database. For example, one known method is LSH (locality sensitive hashing, for example as described in "Near-Optimal Hashing Algorithms for Approximate Nearest Neighbor in High Dimensions" (by Alexandr Andoni and Piotr Indyk). Communications of the ACM, vol. 51, no. 1, 2008, pp. 117-122). The similarity engine thus determines a set of similar images which are then output to a user. For example, FIGS. 1a and 1c are output in this example and thus the color histogram may not have been used. If the color histogram had been used, FIG. 1b may have been output rather than FIG. 1a. Similarly, if the gender of the model had been used to filter results, FIG. 1c would not have been output. When the images are displayed to the user, the user can then, for example, click on one of those images to restart the search (iterative search) or could visit the page that the item is originally from to find out more about it or to buy it.

The server for conducting the search can be implemented using standard hardware. The hardware components of any server typically include: a central processing unit (CPU), an Input/Output (I/O) Controller, a system power and clock source; display driver; RAM; ROM; and a hard disk drive. A network interface provides connection to a computer network such as Ethernet, TCP/IP or other popular protocol network interfaces. The functionality may be embodied in software residing in computer-readable media (such as the hard drive, RAM, or ROM). A typical software hierarchy for the system can include a BIOS (Basic Input Output System) which is a set of low level computer hardware instructions, usually stored in ROM, for communications between an operating system, device driver(s) and hardware. Device drivers are hardware specific code used to communicate between the operating system and hardware peripherals. Applications are software applications written typically in C/C++, Java, assembler or equivalent which implement the desired functionality, running on top of and thus dependent on the operating system for interaction with other software code and hardware. The operating system loads after BIOS initializes, and controls and runs the hardware. Examples of operating systems include Linux™, Solaris™, Unix™, OSX™ Windows XP™ and equivalents.

Figure 8:
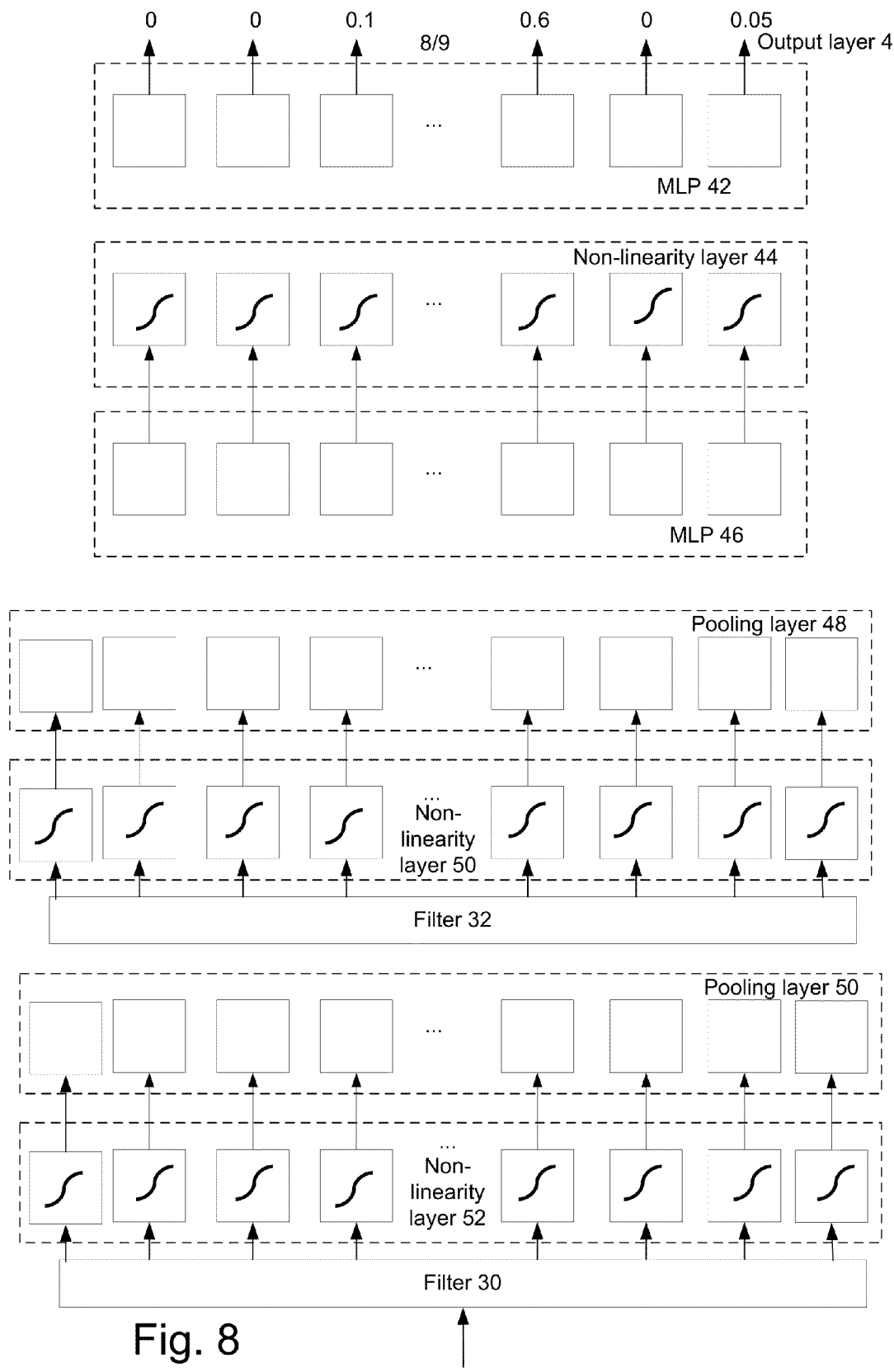
FIG. 8 is a detailed schematic drawing of the learning system and a schematic illustration at each stage of the learning system.

FIG. 8 shows more detail of the learning system which is used in a preferred embodiment of the invention. The learning system comprises an output layer 40 which contains one node (neuron) per category. Various categories may be included such as categories for pattern such as horizontal stripes, flowers, polka-dots, plain etc. The number of nodes corresponds to the number of categories, for example in the present case this is 22. The output layer is a set of numbers which preferably sum to one and which represent the extent to which each of these categories is contained in the patch. For example, as shown, the numbers are $\{0,0,0.1,\ldots,0.6,0,0.05\}$. Thus, if the category having the number 0.6 was horizontal stripes, the output shows that this is the most dominant pattern. As an alternative, the layer below the output layer may be used as the output from the neural network. Such an output would be more abstract but may provide a better (richer) feature for comparing and searching images.

As shown in the example of FIG. 8, the learning system has at least two convolutional layers each of which comprises a set of convolutional filters, a tanh layer (which reduces the input values into a smaller range) and a max-pooling layer (which reduces the dimension of the input data). A connectivity table between the units in two consecutive layers is chosen when the system is initialized created. If the units in each layer were fully connected, there would be m×n connections where m are the number of units in the first layer and n are the number of units in the next layer. The number of connections between layers may be reduced by using a smaller number of units from the first layer (e.g. k where k may be 3 rather than 128). Thus each unit in the next layer is connected with k units in the previous layer, with the k units being selected at random. These selections need to be fixed at network creation time, otherwise the signals received by units would not be consistent. Thus the connectivity between units in two consecutive layers is fixed at start-up.

A patch is input to the first convolutional layer marked as filter 30. Each patch is a fixed size, e.g. 32×32 pixels and as explained in FIG. 7, it is preferably a gray scale image. The filter 30 comprises a fixed number of filters, in this example sixteen, each having a kernel (also termed weight matrix) of the same size, in this example 5×5. Each kernel of each filter is preferably different. The patch is input once to each filter to be convolved therewith. The convolution process adds bias at every point and results in the same number of maps (or first modified patches) as the number of filters (in this case 16). Moreover, since the filters all have the same size, the filtered patches all have the same fixed size, in this case 28×28 pixels (for an input patch of 32×32 pixels). Inputting the input patch 100 to the first convolutional layer results in n filtered patches 102a, . . . 102n. The general aim of applying the first set of convolutional filters is to highlight any first order pattern within the input patch.

Each filtered patch is then passed through a tanh nonlinearity in a tanh layer 52. Each of the n filtered patches 102a, . . . 102n is transformed to an non-linear filtered patch 104a, . . . 104n. Thus, there is only one connection between each filter in the convolutional filter layer and each tanh unit in the tanh layer. As set out above, this connectivity is defined at the outset.

It will be appreciated that a tanh non-linearity is just one of many options but is a standard choice in the literature. Use of a non-linearity increases the space of mappings which the network can learn. In theory ten linear layers are equivalent to a single layer, because the composition of linear functions is a linear function. Thus a network with linear layers can only learn linear functions. However, when introducing a differentiable non-linearity such as the hyperbolic tangent (tanh), or the logistic sigmoid, even a two layer network can theoretically represent any continuous function, with arbitrary precision. That is a huge increase in capacity. Intuitively, the difference between the two spaces of functions is that between the space of all lines in 2D and the space of any function one can draw without lifting the pen off the paper. Tanh is a useful non-linearity because its outputs are centered at 0, and hence the representations it produces are somewhat 0-meaned. That makes learning easier in higher layers.

Each output from the tanh layer is then downsampled, i.e. reduced in size, in the pooling layer 50. Each of the n non-linear filtered patch 104a, . . . 104n is then transformed to a reduced non-linear filtered patch 106a, . . . 106n. Thus, there is only one connection between each tanh unit in the tanh layer and each reduction unit. The reduction unit for example applies a max-pooling operation. Max pooling is just one type of pooling but it has been shown in several empirical studies to be superior to other types of pooling such as L2 or sum/mean-pooling. When reducing the dimensions of an image some things have to be sacrificed. Max pooling sacrifices exact position information within small neighborhoods in order to emphasize strong activations of filters. In our case we can ignore small translations in images, since they don't change the class. Thus the average, or the norm of filter activations are less important than the maximum value of these activations on the original input patch.

One example of max-pooling can be done over a grid of 2×2 pixels (using a step of 2 in both directions). The step-size just means how far we move the window that we're looking at each step. This is illustrated in FIGS. 9a to 9d which shows that in this case, the step size is the same size as the window. Thus, each pixel is only included once. However, the method can also be done such that the step size is smaller, so we look at overlapping areas.

In this example, max-pooling is used to reduce each non-linear filtered patch of 28×28 pixels to a reduced non-linear filtered patch of size 14×14. The value of each entry in the 14×14 grid is the maximum activation between the 4 pixels in the corresponding 2×2 cell of the filtered patch of 28×28 pixels (after the tanh nonlinearity has been applied).

It will be appreciated that the sizes of the patches are for illustration and different sizes may be used. Both the pooling and non-linearity layers are also optional but result in improved performance. For example, omitting the pooling layer results in a larger data set and the neural network will take longer to learn the data. Similarly, as explained above, the non-linearity layer increases the space of mappings but could be omitted. Moreover, in the example above, we have only single connections between the filters, tanh units and reduction units. Accordingly, the number of outputs is the same as the number of inputs (i.e. n=16). The number of connections could be increased but this would increase complexity.

As set out above, the aim of the first set of convolutional filters is to highlight any first order patterns. The learning system also comprises a second set of convolutional filters which act on the outputs of the first convolutional layer (after optional non-linearity and pooling has taken place) to highlight any second order pattern.

The second convolutional layer marked filter 32 also comprises a fixed number m of filters, in this case 64. Each filter has a kernel of the same size, in this example 5×5 with each filter typically being different. In contrast to the previous convolutional layer, Each of the 64 filters has k (in this case four) inputs. The four inputs correspond to four of the sixteen outputs from the previous layer, i.e. four of the reduced non-linear filtered patches (of size 14×14). The four inputs are selected at random from the group of sixteen at startup but are fixed thereafter so that each filter continues to receive inputs from the same four channels. Each filter is convolved with the respective four inputs and the convolution process adds bias at every point. The result is 256 maps (or second modified patches) all of the same fixed size, in this case 10×10 (for an original input patch of 32×32 pixels).

Each reduced non-linear filtered patch 106a, . . . 106n is thus convolved with a number of filters which ranges between 1 and m. Accordingly, the reduced non-linear filtered patch 106a is transformed into two filtered patches 108a, 108a'. Each of filtered patches 108a, 108a' is created using a different filter and thus the outputs may be different. Similarly, reduced non-linear filtered patch 106b is transformed into three filtered patches 108b, 108b', 108b". The system is constrained so that overall the number of filtered patches is 256 (i.e. k×m; 4×64).

As before, each filtered patch 108a', . . . 108n" is then passed through a tanh nonlinearity in a tanh layer 50 to create a corresponding number of non-linear filtered patches 110a, ... 110n". Each output from the tanh layer is then downsampled in the pooling layer 48 in a similar method to that described above. This results in 256 outputs (i.e. 256 reduced non-linear filtered patches 112a, ... 112n") of size 5×5.

The next layer is the learning section of the neural network 46 (e.g. an MLP multi-layer perceptron) which processes the 6400 outputs (256×5×5) to perform supervised learning. The learning section thus has 6400 input units which are connected to 128 tanh units in a final tanh layer 44. The 128 tanh units are in turn connected to 22 output (linear) units such that each output of the tanh layer is passed to every node in a second learning section.

Thus, in the embodiment shown, there are two convolutional sections which process the data before it is fed to two learning sections.

In one particular example, the full architecture was trained with stochastic gradient descent (SGD), using mini-batches of size 10 and a learning rate of 0.001. The training to testing ratio used was 5:1. (i.e. 83% training, 17% testing). A successful result was achieved using 238,000 patches from 1046 images. It will be appreciated that a different number of patches may also give a successful result. The patches were extracted at three different scales and a number of linear distortions were applied to artificially increase the size of the dataset, for example, mirroring, jittering, flipping, zoom-in by a small random factor, etc. The patches were labelled by splitting in 22 categories for pattern. The test dataset consisted of about 58,000 patches similarly labeled. Training was done in epochs with each epoch taking roughly 30-60 minutes (30 minutes with 4 cores (on a single server), 60 minutes with 1 core). The training set of 238,000 patches took approximately 50 epochs, i.e. around 24 hours to train the whole network. During the training period, the network learnt the weights using back-propagation.

Figure 9A:
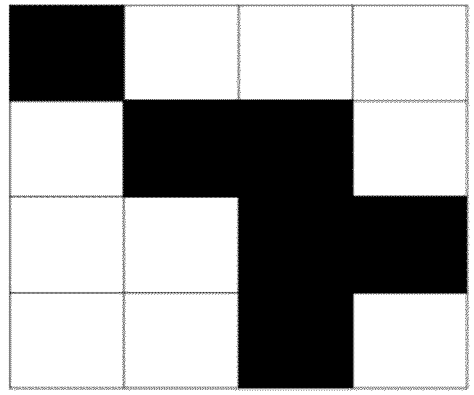
FIGS. 9a to 9d illustrate step-wise max-pooling.
Figure 9B:
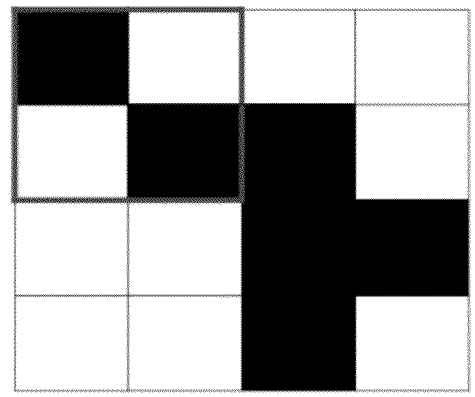
Figure 9C:
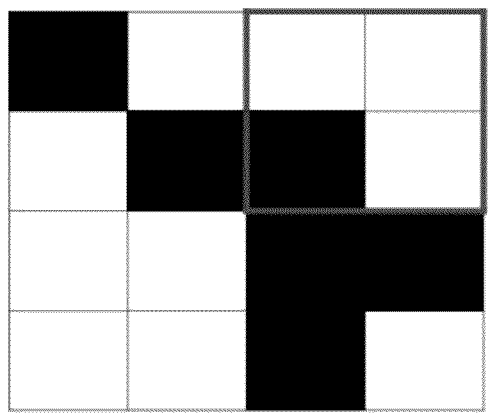
Figure 9D:

FIGS. 9a to 9d illustrate the downsampling method used. FIG. 9a shows the starting array of 4×4 pixels. For simplicity, they have been simplified to values which are zeros (white) and ones (black) but generally the pixel values will lie between 0 and 1 because the pixels are grey-scale. To reduce the number of values, FIG. 9b shows that a 2×2 grid is laid over the top left section. There are lots of pooling strategies (e.g., arithmetic mean) in this example, we use max-pooling, which means we just find the maximum value. In this case, it's 1. So we replace all four of those pixels with a single value: 1. Now we move on horizontally by 2 to the position shown in FIG. 9c (top right). Again, the maximum value is 1. Now we move onto the bottom left 2×2 section, which has no black cells, so we replace this with 0. Finally, we replace the bottom right 2×2 with 1. FIG. 9d shows the final smaller image which represents our original image.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A computer-implemented method comprising:
maintaining characterization data for each of a plurality of images, the characterization data for each image characterizing clothing worn by a person pictured in the image, the characterization data for each image including a feature record that includes a respective number for each of a plurality of pattern categories, the respective number for each of the plurality of pattern categories representing an extent to which the pattern category is contained in the clothing worn by the person pictured in the image;
receiving a request from a user, the request identifying an input image;
generating characterization data for the input image, the characterization data for the input image characterizing clothing worn by a person pictured in the input image, wherein generating the characterization data for the input image comprises:
identifying a face within the input image;
extracting a clothing subsection from the input image, wherein extracting the clothing subsection from the input image comprises removing a background from the input image, removing the face from the input image, and removing other skin areas from the input image;
determining a size of the face in the input image;
rescaling the clothing subsection based on the size of the face in the input image;
taking one or more fixed size patches from the rescaled clothing subsection;
gray scaling each of the fixed size patches to remove color from the fixed size patch; and
processing only the gray scaled fixed size patches using a learning network to generate a feature record for the input image, the feature record for the input image including a respective number for each of a plurality of pattern categories, the number for each of the plurality of pattern categories representing an extent to which the corresponding pattern category is contained in the clothing worn by the person pictured in the input image;
selecting, using the characterization data for the input image and the maintained characterization data, one or more similar images to the input image from the plurality of images; and
providing the similar images for presentation to the user in response to the request.

2. The method of claim 1, wherein extracting the clothing subsection from the input image comprises analyzing the identified face to determine a skin tone for the face.

3. The method of claim 2, wherein removing the other skin areas from the input image comprises removing the other skin areas using the skin tone.

4. The method of claim 3, wherein extracting the clothing subsection from the input image comprises applying a median filter to replace any speckles of skin tone.

5. The method of claim 2, wherein extracting the clothing subsection from the input image comprises using a skin tone mask to remove any patches from the input image having a similar color to the skin tone.

6. The method of claim 5, wherein removing the background comprises applying a background mask and wherein the skin tone mask is combined with the background mask.

7. The method of claim 1, wherein each patch is 32×32 pixels.

8. The method of claim 1, comprising extracting a plurality of fixed size patches from within the extracted subsection and processing each of the plurality of patches using the learning system.

9. The method of claim 1, wherein the learning system is a neural network.

10. The method of claim 9, wherein the neural network comprises at least one set of convolutional neural network filters.

11. The method of claim 10, wherein the neural network comprises a first set of convolutional filters which generates a first set of outputs and a second set of convolutional filters which generate a second set of outputs derived from the first set of outputs.

12. The method of claim 11, wherein the first set of outputs are input to the second set of convolutional filters via a non-linear layer.

13. The method of claim 11, wherein the first set of outputs are input to the second set of convolutional filters via a down-sampling layer.

14. The method of claim 11, wherein each of the second set of convolutional filters receives a plurality of outputs selected from the first set of outputs.

15. The method of claim 11, wherein the second set of outputs are input to another learning network.

16. The method of claim 1, further comprising training the learning system using a set of training images, wherein, for each training image, the pattern categories contained in the clothing worn by the person pictured in the training image are known.

17. The method of claim 1, wherein the characterization data for each image further includes a color histogram for the image that characterizes colors of the clothing worn by the person pictured in the image.

18. The method of claim 17, wherein generating the characterization data for the input image further comprises processing the clothing subsection using a color analysis module to generate a color histogram for the clothing worn by the person pictured in the input image, and wherein selecting one or more similar images to the input image from the plurality of images comprises selecting images that have a similar feature record and a similar color histogram to the feature record and the color histogram for the input image as the similar images to the input image.

19. The method of claim 1, wherein the characterization data for each image includes a face to clothing distance for the image, the face to clothing distance being a distance in the image between a face of the person pictured in the image and a clothing subsection of the image.

20. The method of claim 19, wherein generating the characterization data for the input image further comprises determining a distance in the input image between the face identified in the input image and the clothing subsection extracted from the input image, and wherein selecting one or more similar images to the input image from the plurality of images comprises selecting images that have a similar face to clothing distance to the distance in the input image between the face identified in the input image and the clothing subsection extracted from the input image.

21. A system comprising one or more computers and one or more storage devices storing instructions that when executed by the one or more computers cause the one or more computers to perform operations comprising:
   maintaining characterization data for each of a plurality of images, the characterization data for each image characterizing clothing worn by a person pictured in the image, the characterization data for each image including a feature record that includes a respective number for each of a plurality of pattern categories, the respective number for each of the plurality of pattern categories representing an extent to which the pattern category is contained in the clothing worn by the person pictured in the image;
   receiving a request from a user, the request identifying an input image;
   generating characterization data for the input image, the characterization data for the input image characterizing clothing worn by a person pictured in the input image, wherein generating the characterization data for the input image comprises:
   identifying a face within the input image;
   extracting a clothing subsection from the input image, wherein extracting the clothing subsection from the input image comprises removing a background from the input image, removing the face from the input image, and removing other skin areas from the input image;
   determining a size of the face in the input image;
   rescaling the clothing subsection based on the size of the face in the input image;
   taking at least one fixed size patch from the rescaled clothing subsection;
   gray scaling each of the fixed size patches to remove color from the fixed size patch; and
   processing only the gray scaled fixed size patches using a learning network to generate a feature record for the input image, the feature record for the input image including a respective number for each of a plurality of pattern categories, the number for each of the plurality of pattern categories representing an extent to which the corresponding pattern category is contained in the clothing worn by the person pictured in the input image;
   selecting, using the characterization data for the input image and the maintained characterization data, one or more similar images to the input image from the plurality of images; and
   providing the similar images for presentation to the user in response to the request.

22. A computer-readable medium storing instructions that, when executed by one or more computers, cause the one or more computers to perform operations comprising:
   maintaining characterization data for each of a plurality of images, the characterization data for each image characterizing clothing worn by a person pictured in the image, the characterization data for each image including a feature record that includes a respective number for each of a plurality of pattern categories, the respective number for each of the plurality of pattern categories representing an extent to which the pattern category is contained in the clothing worn by the person pictured in the image;
   receiving a request from a user, the request identifying an input image;
   generating characterization data for the input image, the characterization data for the input image characterizing clothing worn by a person pictured in the input image, wherein generating the characterization data for the input image comprises:
   identifying a face within the input image;
   extracting a clothing subsection from the input image, wherein extracting the clothing subsection from the input image comprises removing a background from the input image, removing the face from the input image, and removing other skin areas from the input image;
   determining a size of the face in the input image;
   rescaling the clothing subsection based on the size of the face in the input image;
   taking at least one fixed size patch from the rescaled clothing subsection;

gray scaling each of the fixed size patches to remove color from the fixed size patch; and processing only the gray scaled fixed size patches using a learning network to generate a feature record for the input image, the feature record for the input image including a respective number for each of a plurality of pattern categories, the number for each of the plurality of pattern categories representing an extent to which the corresponding pattern category is contained in the clothing worn by the person pictured in the input image;

selecting, using the characterization data for the input image and the maintained characterization data, one or more similar images to the input image from the plurality of images; and providing the similar images for presentation to the user in response to the request.

* * * * *